United States Patent
Franco et al.

(10) Patent No.: US 6,262,572 B1
(45) Date of Patent: Jul. 17, 2001

(54) THERMO-RESISTIVE GLIDE TEST HEAD FOR DISC DRIVE RECORDING MEDIA

(75) Inventors: Luis Padilla Franco, Gilroy; Erich Sawatzky, San Jose; Roland Eugene Imboden, Milpitas, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 08/855,142

(22) Filed: May 13, 1997

Related U.S. Application Data

(60) Provisional application No. 60/023,284, filed on Jul. 25, 1996, and provisional application No. 60/023,285, filed on Jul. 25, 1996.

(51) Int. Cl.[7] .......................... G01N 27/82; G01N 25/72; G01B 5/28; G11B 27/36
(52) U.S. Cl. .................... 324/212; 73/10.5; 360/25; 374/7
(58) Field of Search ...................... 324/210, 212, 324/252; 73/104, 105; 374/4–7; 338/32 R; 360/72.1, 75, 25, 31, 103, 6

(56) References Cited

U.S. PATENT DOCUMENTS

| | | | |
|---|---|---|---|
| 3,887,944 | * | 6/1975 | Bajorek et al. ................... 360/113 |
| 4,532,802 | * | 8/1985 | Yeack-Scranton et al. ...... 324/212 X |
| 5,233,482 | * | 8/1993 | Galbraith et al. . |
| 5,527,110 | * | 6/1996 | Abraham et al. ..................... 374/5 |
| 5,537,034 | * | 7/1996 | Lewis ................................. 324/212 |
| 5,640,089 | * | 6/1997 | Horikawa et al. ................... 324/212 |
| 5,753,803 | * | 5/1998 | Abraham et al. ..................... 374/5 X |
| 5,901,001 | * | 5/1999 | Meyer et al. ......................... 360/25 |

OTHER PUBLICATIONS

Fontana et al; "Disk Asperity Detector", IBM Technical Disclosure Bulletin, vol. 26, No. 3A, pp 1278–1280, Aug. 1983.*

* cited by examiner

*Primary Examiner*—Gerard R. Strecker
(74) *Attorney, Agent, or Firm*—Westman, Champlin & Kelly, P.A.

(57) ABSTRACT

An improved media defect glide test head assembly which incorporates a wide thermo-resistive (TR) element suitable for detection of thermal asperities on the surfaces of magnetic recording discs. The TR element of the inventive glide test head assembly is very wide when compared to magneto-resistive (MR) elements in normal MR read/write heads. In the currently preferred embodiment, the TR element is envisioned to be as wide as is possible to fabricate on the trailing edge of an air bearing element of the glide test head assembly, to enable detection of thermal asperities across a relatively wide band of disc surface during each disc rotation, thus enabling rapid testing of the media surface. In a second aspect of the invention, the wide TR element is envisioned to be formed of nickel or other material having a large thermal resistance coefficient. In a third aspect of the invention, the wide TR element is envisioned to include intermediary taps which permit more precise mapping of the location of thermal asperities. Control logic for implementing mapping of TR-detected disc defects is also disclosed.

1 Claim, 8 Drawing Sheets

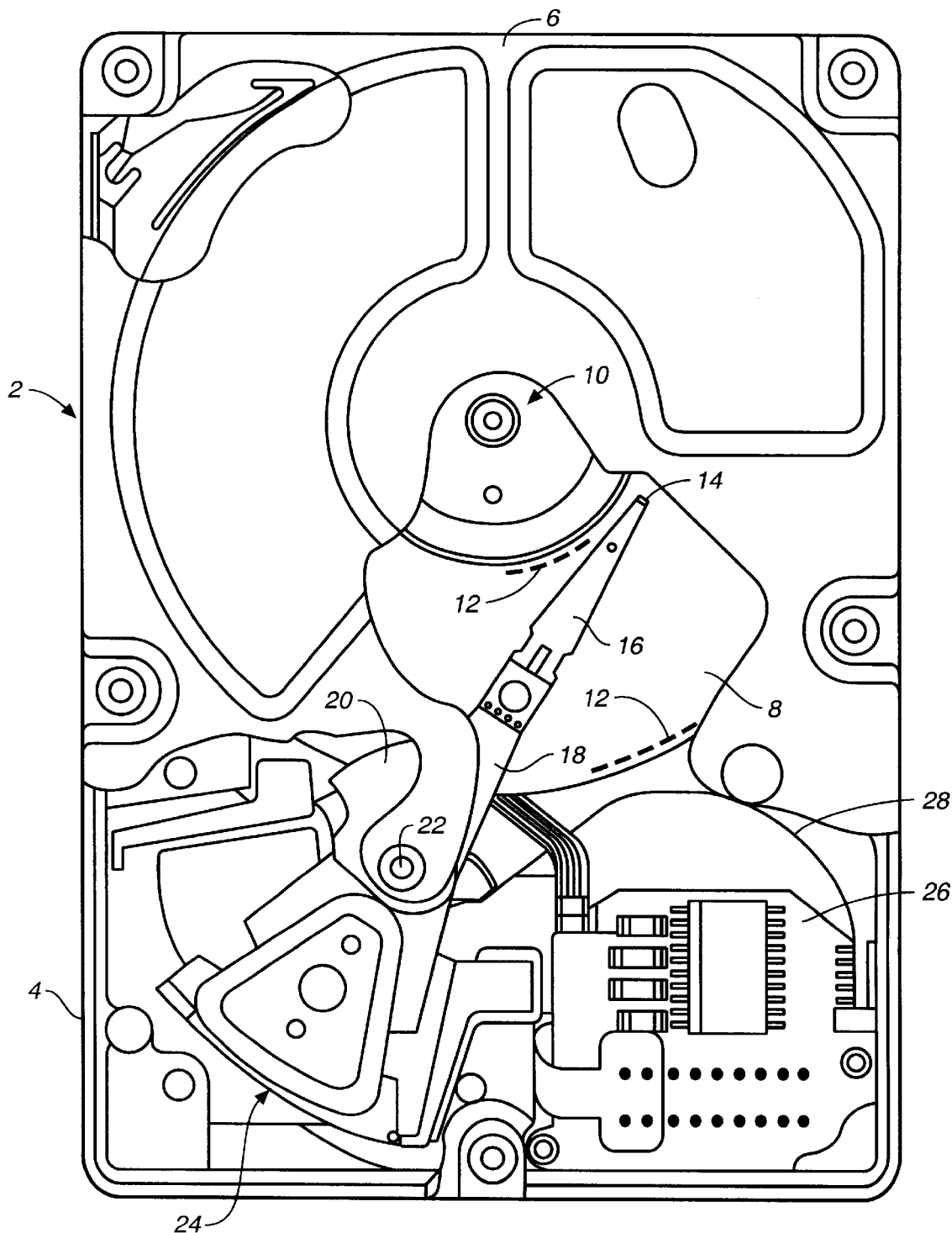
FIG._1 (PRIOR ART)

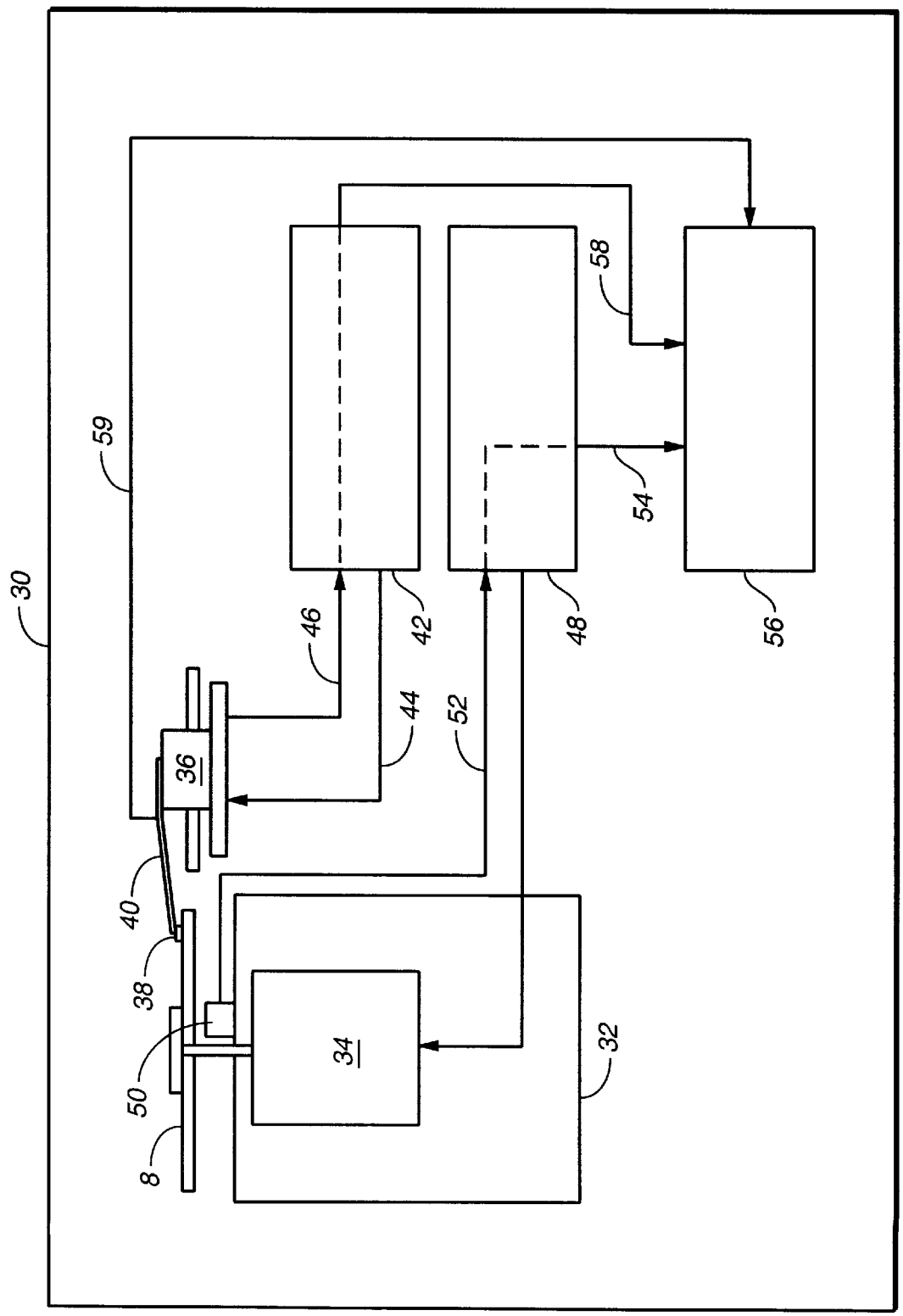
FIG._2

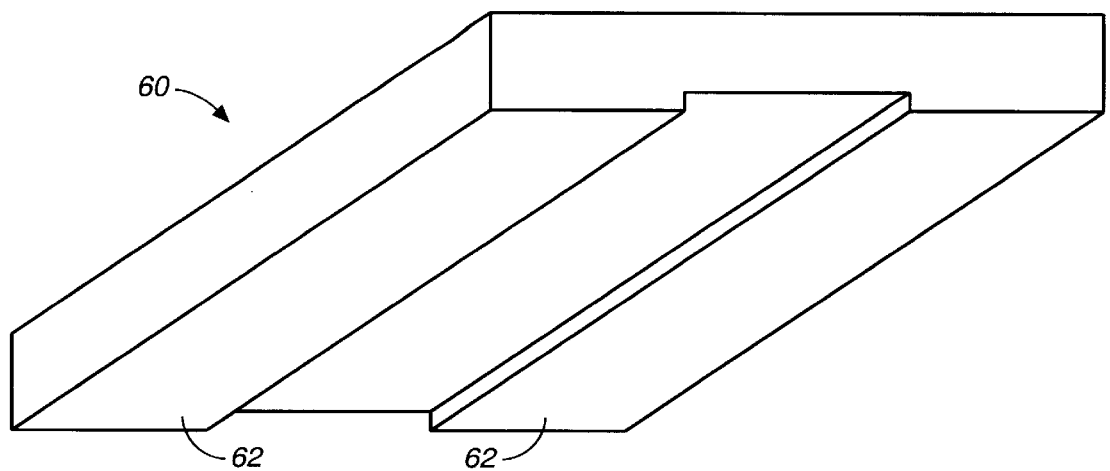
FIG._3 (PRIOR ART)
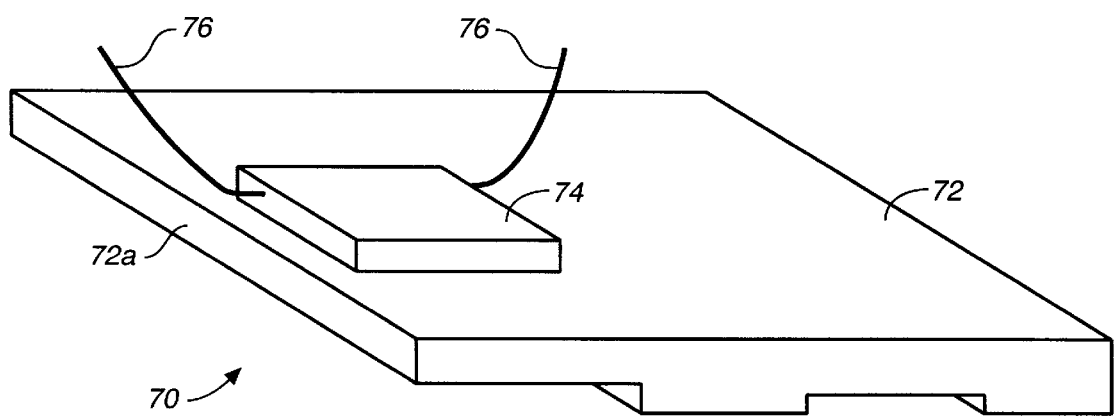
FIG._4 (PRIOR ART)

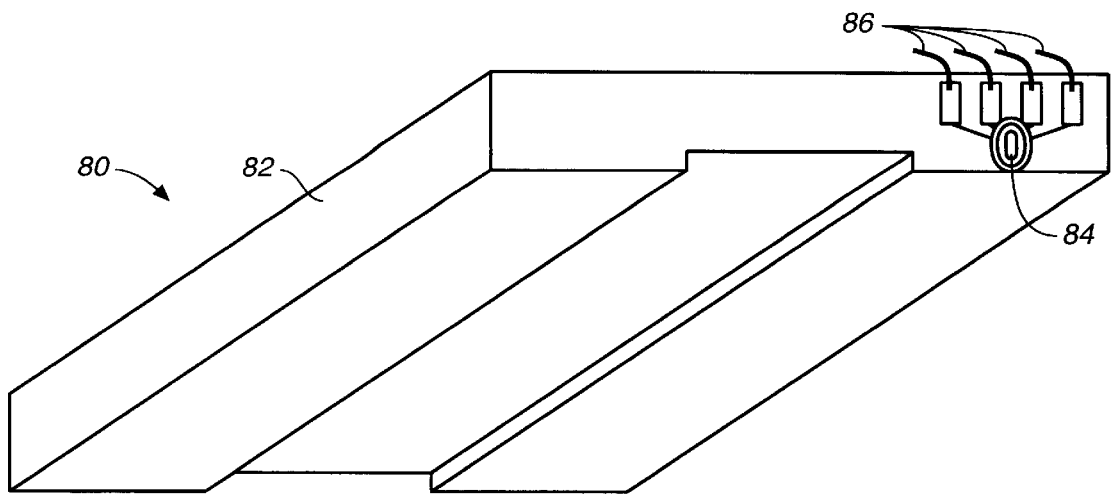
FIG._5 (PRIOR ART)
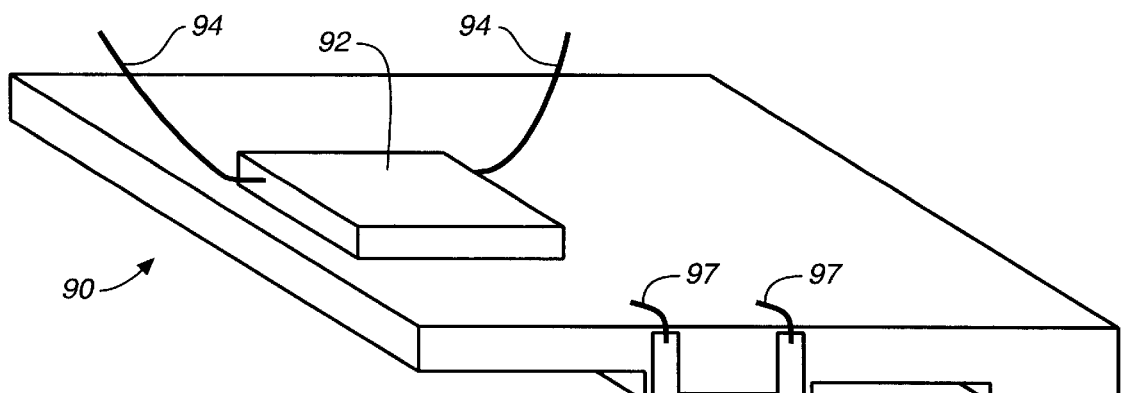
FIG._6 (PRIOR ART)
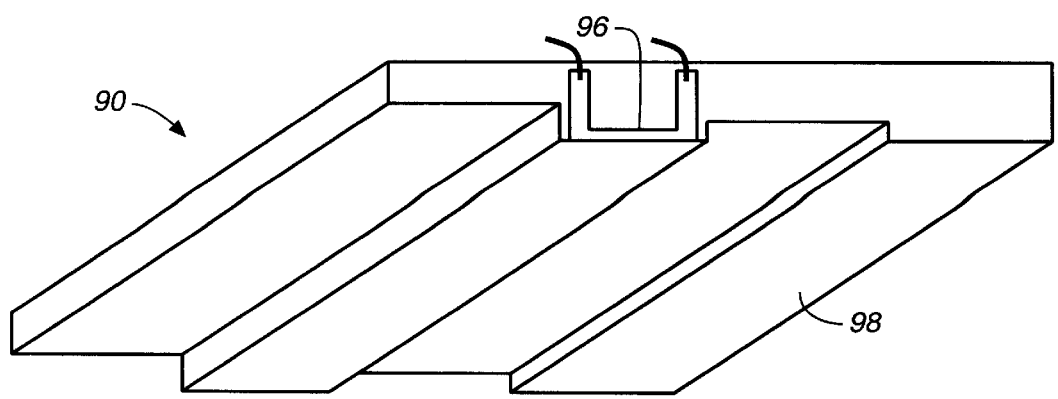
FIG._7

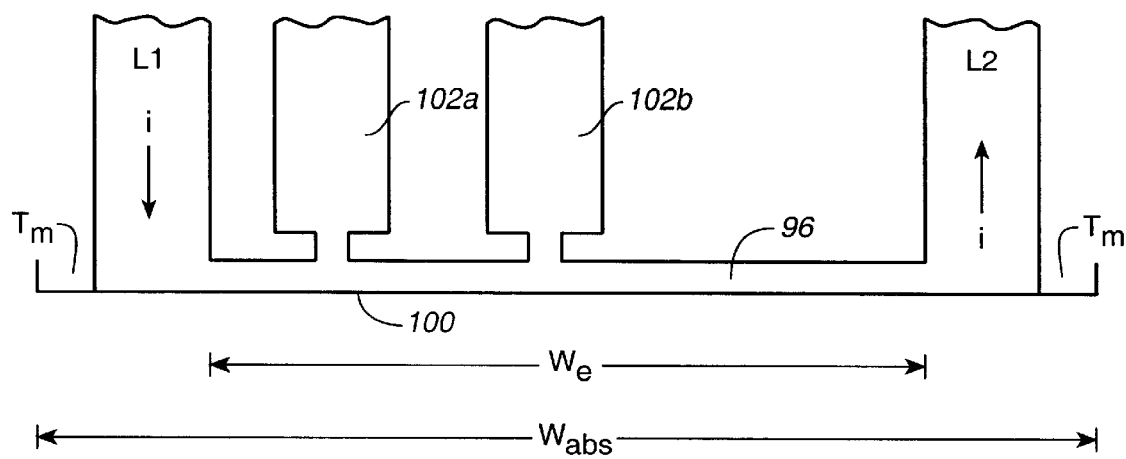
FIG._8
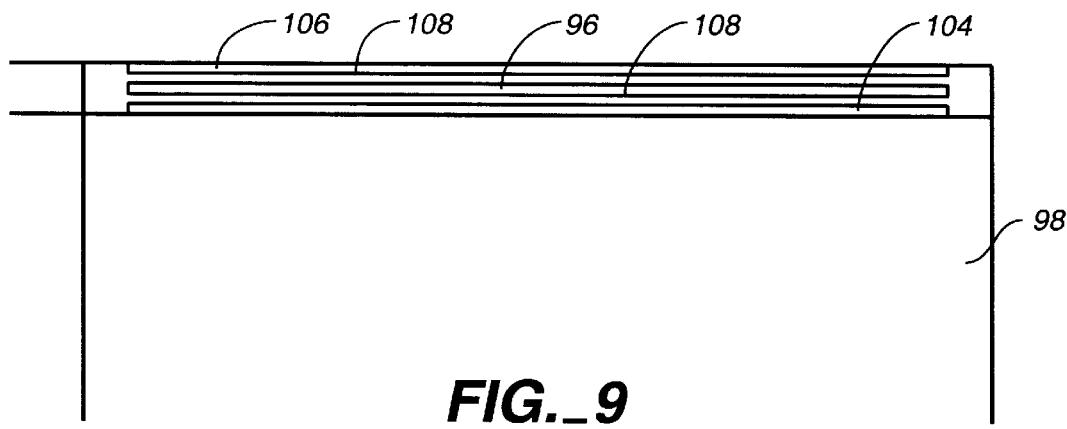
FIG._9
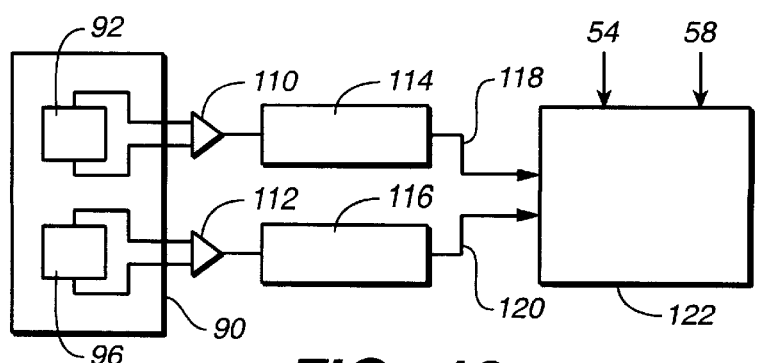
FIG._10

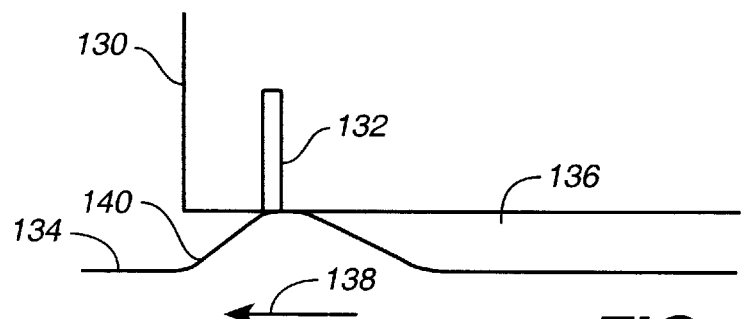
FIG._11A
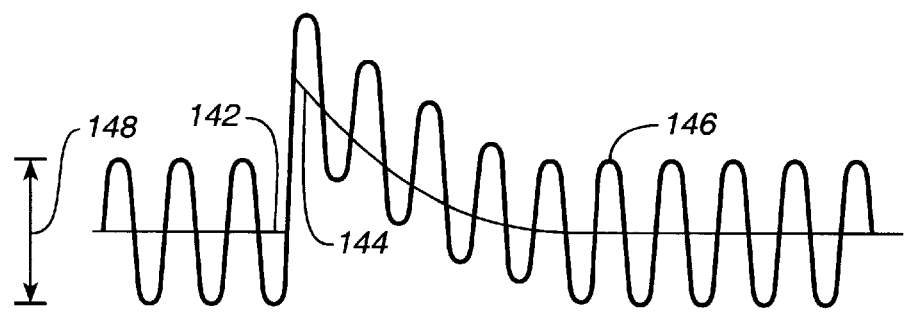
FIG._11B
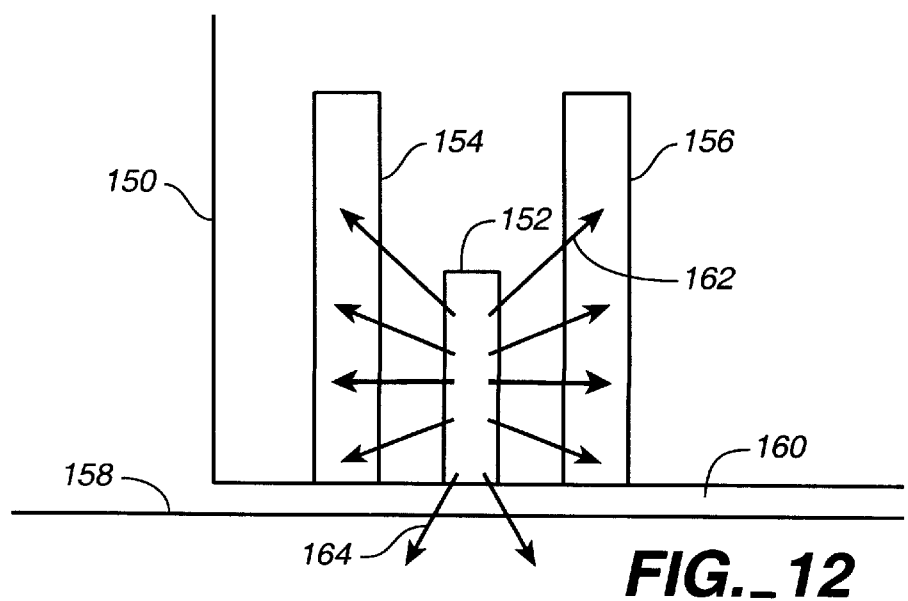
FIG._12

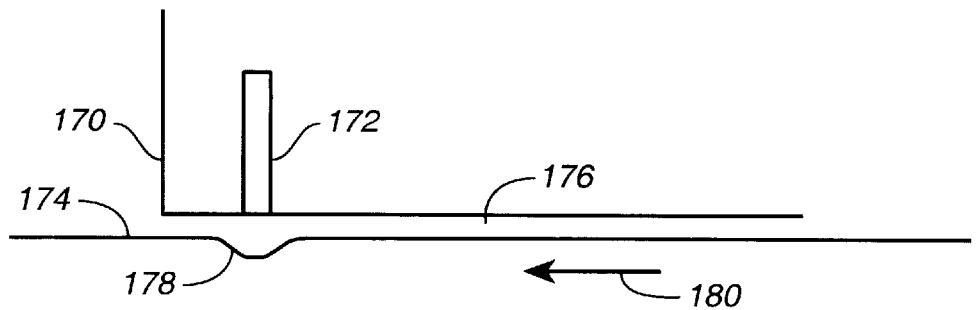
FIG._13A
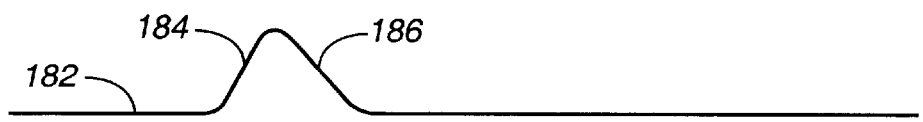
FIG._13B
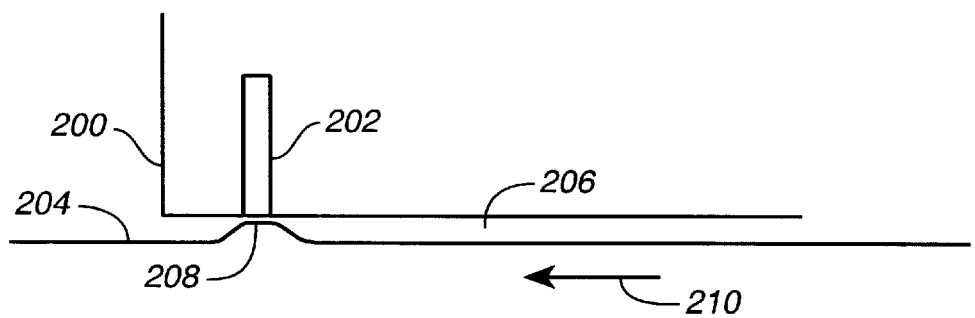
FIG._14A
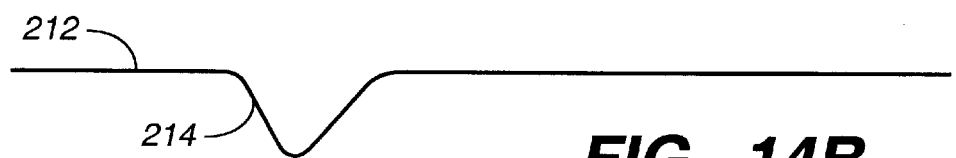
FIG._14B

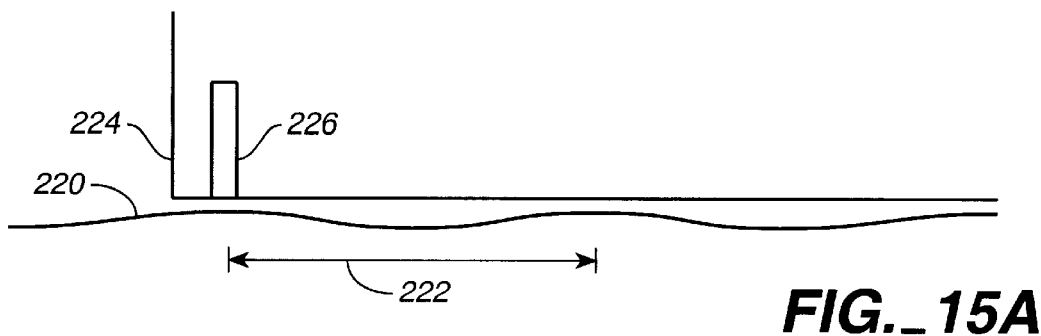
FIG._15A
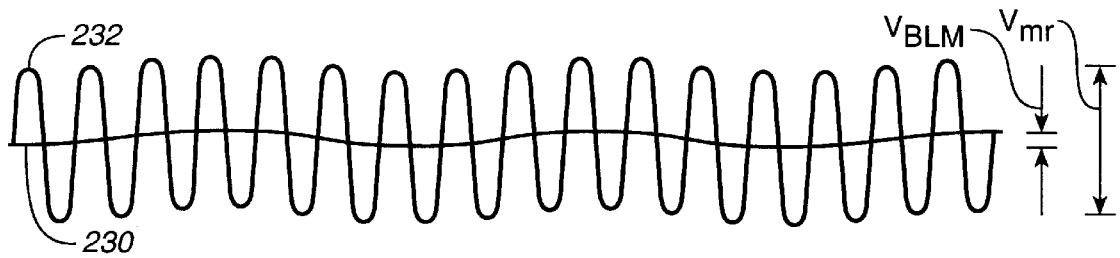
FIG._15B
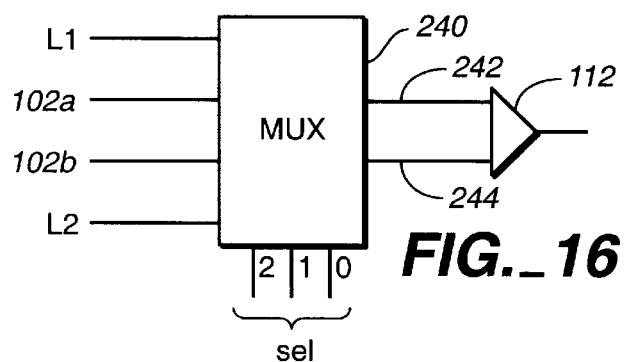
FIG._16
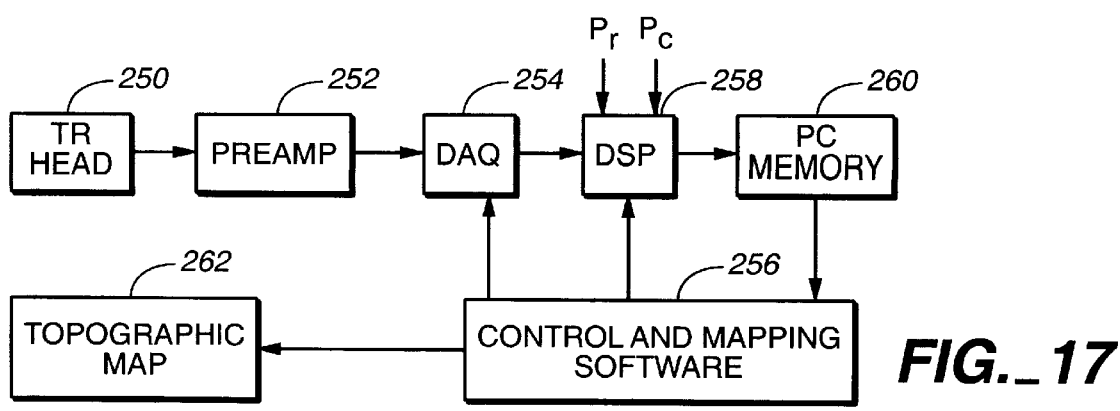
FIG._17

THERMO-RESISTIVE GLIDE TEST HEAD FOR DISC DRIVE RECORDING MEDIA

CROSS REFERENCE TO RELATED APPLICATIONS

This application claims the benefit of U.S. Provisional Application Ser. Nos. 60/023,284 and 60/023,285, both filed Jul. 25, 1996.

BACKGROUND OF THE INVENTION

This invention relates generally to the field of disc drive data storage devices or disc drives, and more particularly, but not by way of limitation, to an improved glide test head, a topographic mapping head and improved systems for testing and characterizing the surface of disc drive recording media.

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼ " format. Disc drives of the current generation typically have a data capacity of over a gigabyte (and frequently several gigabytes) in a 3½ " package which is only one fourth the size of the full height, 5¼ " format or less. Even smaller standard physical disc drive package formats, such as 2½ " and 1.8", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction was needed to reduce the size of the individual bit domain and allow greater recording density.

Since the reduction in gap size also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a non-magnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, since the size of contemporary head gaps allowed data recording and retrieval with a head flying height of twelve microinches (0.000012 inches) or greater, the surface characteristics of the discs were adequate for the times.

Disc drives of the current generation incorporate heads that fly at nominal heights of only about 2.0 $\mu$", and products currently under development will reduce this flying height to 1.5 $\mu$" or less. Obviously, with nominal flying heights in this range, the surface characteristics of the disc medium must be much more closely controlled than was the case only a short time ago.

With the incorporation of MR heads in disc drives, a new type of media defect called a thermal asperity, or TA, has become of concern to the industry. Such defects are referred to as "thermal" asperities because they cause non-data related temperature variations in the MR element. These temperature variations result in resistance changes in the MR element, which in turn lead to read errors in the disc drive. Thermal asperities can be experienced in several modes, which will be discussed below.

The first mode in which TAs are exhibited can be referred to as "contact TAs". Contact TAs occur when actual physical contact occurs between the MR element of the MR head and a "high" spot on the disc surface. Such physical contact causes rapid frictionally-induced heating of the MR element, with an attendant large rapid change in the resistance of the MR element. A simplified representation of the component relationship that causes a contact TA, along with the resultant effect on the read data channel, are shown in FIGS. 11A and 11B, respectively.

FIG. 11A shows a head slider 130 which includes a MR read element 132. This MR read element is sometimes referred to as a "MR stripe". The nominal surface of a disc is shown at 134, and the space 136 between the lower surface of the slider 130 and the nominal disc surface 134 represents the flying height of the slider 130. The relative sizes shown for the slider 130, MR stripe 132 and flying height 136 are not to scale and are for purposes of discussion only.

In the figure, the disc is moving relative to the slider 130 in the direction shown by arrow 138.

As the disc rotates beneath the slider 130, a high spot 140 on the disc surface passes under the MR element 132. The vertical height of the high spot 140 is large enough that contact occurs between the disc and the MR element 132. This contact causes frictionally-induced heating of the MR element 132. As is well known in the art, such heating of the MR element 132 results in a proportional increase in the resistance of the MR element local to the point of contact. The effect of this frictionally-induced heating and resistance change is illustrated in FIG. 11B.

As is known in the industry, a constant bias current is applied across the MR element of a MR head. In normal operation, any change in the magnetic flux on the disc surface which passes below the MR element causes a corresponding change in the resistance of the MR element. The change in resistance, in turn, causes a change in the voltage across the MR element, and this change in voltage is sensed by the data read channel.

FIG. 11B shows the nominal voltage across the MR element as a result of the bias current at 142. As can be seen in the figure, when the high spot 140 on the disc surface contacts the MR element 132, a large voltage spike 144 occurs in the read data channel. The relationship between the change in temperature of the MR element and the change in voltage felt by the read data channel can be expressed by the following relationship:

$$\delta V_{TA} = i \delta R_{TA} = iR \cdot \beta \cdot \delta T_{TA}$$

wherein $\delta V_{TA}$=the change in sensed voltage due to the TA,
i=the constant bias current
$\delta R_{TA}$=the change in resistance of the MR element due to the TA,
R=the nominal resistance of the MR element,
β=the thermo-resistance coefficient of the MR element material, and
$\delta T_{TA}$=the temperature change due to the TA.

The voltage spike 144 has a very rapid rise time (on the order of 20–100 nanoseconds), and returns to its normal level over a relatively long time interval (on the order of a microsecond). This rapid rise and gradual decay of the voltage spike is indicative of the rapid rise in temperature induced by friction when the high spot 140 contacts the MR element 132, and the gradual dissipation of the frictionally-generated heat from the MR element to surrounding elements of the disc drive, as will be discussed in more detail below.

The effect of the thermally-induced voltage spike 144 on the electronics of the read data channel can be best appreciated when a comparison is made between the amplitude of the voltage spike 144 due to the contact TA and the amplitude of normal voltage variations due to magnetically-induced resistance changes caused by data recorded on the disc.

FIG. 11B shows a sine wave 146 which represents the voltage variation sensed in the read data channel as a result of a magnetically recorded constant frequency data signal. As can be seen, this normal data read signal 146 is referenced to and centered on the normal read channel voltage reference 142, and has a nominal voltage range represented by arrow 148. The read data channel logic would, therefore, be optimized to respond to and distinguish voltages within the nominal magnetic-data-induced voltage range 148.

As can be seen in the figure, the thermally-induced voltage spike 144 is significantly greater in amplitude than the nominal data voltage range 148, and the data signal 146 riding the voltage spike 144 far exceeds the expected range of voltage variation. Such a large voltage spike can be expected to saturate the read data channel logic, and, since the voltage spike endures for several cycles of recorded data, be further expected to result in several bits of "lost" data.

While the high spot 140 shown in FIG. 11A is illustrated as an integral part of the disc surface, it will be appreciated by those of skill in the art that similar contact and data recovery losses can result if the high spot 140 were to be instead a particulate contaminant of comparable size which adhered to the disc surface and passed under and contacted the MR element. It is, therefore, common in the industry to refer to contact TAs that result from integral high spots in the disc surface, such as the high spot 140 of FIG. 11A, as "native" TAs, while contact TAs that result from particulate contamination after manufacture are referred to as "grown" TAs, resulting from post-manufacture particulate contamination of the disc surface.

Another mode in which thermal asperities are exhibited will be referred to as "non-contact" TAs, and will be discussed below. However, before such non-contact TAs are discussed, it is necessary to further discuss the normal conditions present in a disc drive incorporating MR heads.

FIG. 12 represents the normal relationship between various elements of the disc drive system, and shows a portion of a slider 150 incorporating a MR element 152. Once again, the relative size of the various elements of the drawing are not to scale, and have been selected for illustrative purposes only. As previously mentioned, during normal operation, a constant bias current is applied across the MR element 152. The application of this bias current results in heating of the MR element. Typical MR heads also include thermally conductive shield elements 154, 156, which may also be functional elements of the inductive write element of the head.

When the slider 150 is in its intended relationship with a disc surface 158, an air gap 160 exists between the slider 150 and the disc surface 158.

The heat generated in the MR element 152 by the application of the bias current dissipates to the shield elements 154, 156, and, to a lesser extent, across the air gap 160 to the disc as shown by arrows 162 and 164 respectively. In actuality, approximately 98% to 99% of the heat generated by the bias current in the MR element 152 is dissipated through the shield elements 154, 156, while approximately 1% to 2% of the heat is conducted across the air gap 160 and into the disc. As will be apparent to one of skill in the art, since a constant bias current is applied to the MR element 152, a state of thermal equilibrium will quickly be thus attained, allowing effective recovery of previously recorded data as a result of magnetically-induced resistance changes in the MR element 152.

Non-contact TAs occur as a result of changes in the just described thermal equilibrium, and can be exhibited in either of two modes. These two non-contact TA types will be referred to as "positive non-contact TAs" and "negative non-contact TAs" and discussed in turn below.

Turning now to FIG. 13A, shown is a slider 170 incorporating a MR element 172. The slider 170 is shown flying above a disc surface 174. The nominal air gap between the slider 170 and the disc surface 174 is designated 176. When the slider 170, disc surface 174 and air gap 176 are in their nominal relationship, the thermal equilibrium described above in relationship to FIG. 12 exists. As can be seen in FIG. 13A, however, a low spot 178 in the disc surface 174 is passing under the MR element 172 as the disc moves relative to the slider 170 in the direction shown by arrow 180.

As the low spot 178 in the disc surface 174 passes under the MR element 172, the distance between the MR element 172 and the disc surface increases. This increase in spacing between the MR element and the disc reduces the effectiveness of the heat dissipation between the MR element 172 and the disc which was designated as the thermal dissipation path 164 in FIG. 12. Since less heat is able to dissipate from the MR element 172 to the disc, the overall temperature of the MR element 172 rises, causing an increase in its resistance. This increase in MR element temperature will continue until either a new thermal equilibrium level is reached, or until the low spot 178 completely passes the MR element 172, at which time the overall temperature of the MR element will return to its original equilibrium level.

The effect of such a low spot 178 passing under the MR element 172 is shown in FIG. 13B. In FIG. 13B, the nominal non-active voltage level sensed by the read data channel as a result of thermal equilibrium is shown at 182. As seen at 184, however, as the low spot 178 of FIG. 13A begins to pass below the MR element, the voltage level begins to rise. This is a result of the increase in resistance in the MR element brought about by the increase in temperature of the MR element due to a decrease in the amount of heat dissipated to the disc from the MR element. Curve 186 shows the voltage level change as the low spot 178 of FIG. 13A passes under the MR element, and illustrates the return to the nominal voltage level 182 once the low spot passes beyond the MR element. A person of skill in the art will appreciate that, if a voltage variation representative of magnetically-induced data recovery—such as that shown at 146 in FIG. 11B—were referenced to the voltage curve 186 caused by the low spot 178, the resultant signal would once again exceed the operational range of the read data channel logic, resulting in saturation of the data recovery logic and loss of any data during the period of the voltage spike 186. It is because the low spot 178 in the disc surface causes a positive voltage spike in the read data channel without direct contact between the disc and the MR element that this type of TA is referred to as a "positive non-contact TA".

FIGS. 14A and 14B illustrate the cause and result of a negative non-contact TA. In FIG. 14A, a slider 200 incorporating a MR element 202 is shown flying above a disc surface 204 at a nominal flying height represented by the air gap 206 between the slider 200 and the disc surface 204. A high spot 208 in the disc surface passes under the MR element 202 as the disc rotates past the slider 200 in the direction of arrow 210. The high spot 208 has a vertical height relative to the nominal disc surface 204 which is less than the vertical dimension of the air gap 206 between the slider 200 and the disc surface 204, so that no direct contact between the MR element 202 and the high spot 208 occurs.

As the high spot 208 passes beneath the MR element 202, however, the air gap between the MR element 202 and the disc is reduced, bringing the MR element 202 and the disc into closer proximity. This increase in proximity allows a greater than normal amount of heat to be dissipated from the MR element to the disc, resulting in sudden increased cooling of the MR element 202. As the temperature of the MR element falls, its resistance also decreases by a proportional amount. The effect of this sudden decrease in the resistance of the MR element is illustrated in FIG. 14B.

In FIG. 14B, numeric reference 212 represents the nominal voltage level sensed by the read data channel when the thermal equilibrium previously discussed exists and no previously recorded magnetic data are influencing the MR element. As the high spot 208 of FIG. 14A passes under the MR element, the increased heat dissipation and attendant reduction in resistance of the MR element causes a sharp reduction in the voltage sensed in the read data channel until the high spot 208 completely passes the MR element and thermal equilibrium is again attained. This causes the negatively-going voltage spike 214 of FIG. 14B.

If, once again, it is envisioned that a varying voltage level, such as that designated 146 in FIG. 11B, representative of recovered magnetic data is referenced to the signal of FIG. 14B, it is apparent that any such signal occurring during the negative pulse 214 would be expected to fall below the threshold level necessary to allow reliable data recovery, and thus cause data loss during the time interval that the high spot is passing below the MR element. It is from the negative voltage spike induced by this non-contacting variation in the disc surface that the designation "negative non-contact TA" derives.

It is common practice in the industry to test for defects in the disc surface using precision glide test units. Such testing is performed on the discs at the component level before the discs are assembled into a disc drive, and typically involves flying a special test head at a height above the disc surface which is approximately half of the nominal flying height intended for the finished disc drive. Glide test units typically utilize linear actuators to move the test heads radially across the surface of the disc under test in order to eliminate the effects of the skew changes inherent in the rotary actuators commonly used in current disc drive products.

One commonly utilized test head used for glide testing includes a hydrodynamic slider unit which mounts a piezo-electric crystal, hereinafter referred to as a piezo element. When a defect on the surface of the disc being tested rotates under the slider, the slider and piezo element are distorted by the variation in hydrodynamic pressure between the head and the disc, and a small voltage is generated by the piezo element as a result. Correlation of these induced voltage spikes to the actuator position and the rotational position of the disc allows a mapping of the defects on the disc surface.

One method currently used to test for TAs involves the use of a normal read/write head incorporating an MR element flown at approximately the flying height intended for the disc drive in which the disc will be incorporated. When the MR element passes one of these TAs, temperature changes in the MR element, caused as described above, induce corresponding changes in the resistance of the MR element. The change in resistance induced by thermal asperities is detectable using electronic circuitry similar to currently employed data read channels for MR heads, and, therefore, these defects can also be mapped, using actuator and spindle position correlation similar to that described above.

The main drawback to the use of standard production MR heads for media defect testing is the fact that the MR elements in such heads are dimensioned to sense data recorded at current data densities. This, in turn, means that the test unit must move the test head across the disc in such small steps that the testing time for a single disc surface is unacceptably long. There is also a low but significant risk that the MR element will be damaged during such testing, thus increasing labor and parts cost.

Furthermore, if both defects detectable using piezo test heads and defects detectable by MR test heads are to be mapped, the disc to be tested must be first mounted on a test unit incorporating a piezo test head, then dismounted and remounted on a test unit incorporating an MR test head, and the two resultant defect maps must then be correlated. Such a test regimen would involve excessive time, disc handling and difficulty of correlating the two defect maps.

A need clearly exists, therefore, for enabling technology which would allow for testing for piezo-element-detectable defects and TAs in disc surfaces in a single, inexpensive test operation.

BRIEF SUMMARY OF THE INVENTION

The present invention includes an improved media defect glide test head assembly which incorporates both a piezo element and a wide thermo-resistive (TR) element. The piezo element is suitable for detection of media defects which cause mechanical distortion of the test head slider, while the wide TR element is suitable for detection of thermal asperities (TAs) which may cause thermally-induced errors in the disc drive in which the disc will be utilized, but which may not be detected by the piezo element. The TR element of the inventive test head assembly is very wide when compared to MR elements in normal MR read/write heads. In the currently preferred embodiment, the TR element is envisioned to be as wide as possible given the width of one of the air bearing surfaces (ABS) of the test head to enable detection of thermal asperities across a relatively wide band of disc surface during each disc rotation, thus enabling rapid testing of the media surface. In a second aspect of the invention, the wide TR element is envisioned to be formed of nickel or other material having a large thermal resistance coefficient. In a third aspect of the invention, the wide TR element is envisioned to include intermediary taps which permit more precise mapping of the location of thermal asperities. In another aspect of the invention, the wide TR element is utilized by itself in a test head used for mapping of thermal asperities only. Control logic for implementing simultaneous mapping of piezo- and TR-detected disc defects is also disclosed. In yet another aspect of the present invention, a specially configured glide test head is described which, together with disclosed test logic, enables the topographic mapping of the disc surface.

It is an object of the invention to provide a media defect glide test head assembly which can be used to simultaneously map both piezo-detected and thermally-induced media defects.

It is another object of the invention to provide a media defect glide test head assembly which includes a TR element which is wide enough to minimize the number of disc rotations necessary to test the entire disc data surface for thermal asperities.

It is another object of the invention to provide a media defect glide test head assembly which is compatible for use with currently available media defect test units with a minimum of additional control electronics.

It is another object of the invention to provide control electronics, suitable for use with the inventive media defect glide test head assembly and commercially available testing units, to provide simultaneous mapping of media defects detected by the piezo element and the TR element of the inventive test head.

It is another object of the invention to provide a TR test head and associated test logic that allows the mapping of the topography of disc surfaces.

These and other objects, features and benefits of the present invention will best be understood by review of the following DETAILED DESCRIPTION OF THE INVENTION when read in conjunction with a study of the accompanying drawings.

BRIEF DESCRIPTION OF THE SEVERAL VIEWS OF THE DRAWING

FIG. 1 is a top plan view of a disc drive including discs which can be tested using the media defect test head assembly and test control logic of the present invention.

FIG. 2 is a simplified functional block diagram of a prior art glide test unit used to test surface characteristics of media used in disc drives.

FIG. 3 is a simplified perspective view of a typical hydrodynamic slider used to mount operational and test transducer elements in a media defect test unit such as that of FIG. 2.

FIG. 4 is a simplified perspective view of a prior art media defect glide test head assembly incorporating a piezoelectric element.

FIG. 5 is a simplified perspective view of a typical prior art operational MR read/write head.

FIG. 6 is a simplified top perspective view of the combination TR/piezo glide test head which is one aspect of the present invention.

FIG. 7 is a simplified bottom perspective view of the combination TR/piezo glide test head of FIG. 6.

FIG. 8 is a simplified elevation view of the wide TR element that forms a part of the present invention.

FIG. 9 is a simplified plan view showing details of the configuration of the TR sensor that incorporates the TR element of FIG. 8.

FIG. 10 is a simplified block diagram of electronic control circuitry which forms another aspect of the present invention.

FIGS. 11A and 11B illustrate component relationships causing contact thermal asperities and the sensed result of contact thermal asperities, respectively.

FIG. 12 shows the relationship between various elements of a disc drive and the thermal dissipation characteristics of these elements.

FIGS. 13A and 13B illustrate component relationships leading to positive non-contact thermal asperities and the sensed result of positive non-contact thermal asperities, respectively.

FIGS. 14A and 14B illustrate component relationships leading to negative non-contact thermal asperities and the sensed result of negative non-contact thermal asperities, respectively.

FIGS. 15A and 15B illustrate component relationships leading to Base-line Modulation and the sensed result of Base-line Modulation, respectively.

FIG. 16 is a simplified functional block diagram of circuitry which can be used with the tapped thermo-resistive element of FIG. 8 to selectively determine the precision of surface characterization using the present invention.

FIG. 17 is a simplified functional block diagram of a test system made in accordance with the present invention for mapping the topography of disc surfaces.

DETAILED DESCRIPTION OF THE INVENTION

Turning now to the drawings and specifically to FIG. 1, shown is a typical disc drive 2 which incorporates discs of the type which can be tested using the present invention. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

In disc drives of the current generation, the head assemblies 14 typically fly above the surfaces of the discs 8 at a nominal height of approximately 2.0 $\mu$". It will be appreciated by a person of skill in the art that even very small defects in the surface characteristics of the discs 8 can result in improper operation of the magnetic interface between the head assemblies 14 and discs 8. Therefore, having the ability to detect and map extremely small defects in the disc surfaces is especially important to the disc drive industry.

FIG. 2 is a simplified functional block diagram of a typical prior art test unit 30 used to test and map the surface of recording discs as components before the discs are assembled into disc drive units. The test unit 30 includes a precision spin stand 32 which further includes a spin motor 34 on which the disc 8 is mounted for rotation and testing.

The test unit 30 also typically includes a linear actuator 36 which is used to controllably move a test head 38, mounted on a head suspension 40, on a linear path across a radius of the disc 8. Actuator control logic 42 is also included in the test unit 30 and provides the control signals on signal path 44 needed to move the test head 38 and monitors, via signal path 46, the position of the test head 38 during testing of the disc 8. In a typical test unit of the current art, the actuator supports and controls a second test head for simultaneous testing of the second disc surface. For purposes of clarity, the figure shows only a single test head 38.

The test unit 30 also includes spin motor control logic 48 which is used to accelerate the spin motor 34 to its intended testing speed. It is common practice in the industry to vary the speed of the spin motor 34 as the test head 38 is moved across the disc radius to provide a constant linear velocity between the test head 38 and the area of the disc being tested. That is, as the test head 38 is moved inward, the speed of the spin motor is increased proportionally to maintain a constant linear velocity.

The spin stand 32 also includes a spin motor position detection element 50 which provides a "once around" reference signal. This reference signal is carried over signal path 52 to the spin motor control logic 48 where it is used to assist in the control of the speed of the spin motor 34. The reference signal is also passed via signal path 54 to defect mapping logic 56, where it is utilized, along with the actuator position signal passed via signal path 58 by the actuator control logic 42, to maintain a constant calculation of the radial and circumferential portion of the disc 8 that is located under the test head 38.

During the testing operation, a disc 8 is mounted on the spin motor 34 and the spin motor 34 is brought up to operational speed by the spin motor control logic 48. Once the spin motor 34 is at the proper speed, the actuator control logic 42 causes the actuator 36 to move the test head 38 into cooperative arrangement with the surface of the disc 8. The test head 38 is then stepped across the spinning disc 8 at a rate selected to cause the test head 38 to pass every portion of the disc surface. As the head is stepped across the disc surface, the spin motor control logic 48 varies the spin motor speed to maintain a constant relative linear velocity between the test head 38 and the disc area being tested as noted above.

A defect on the disc surface will cause the test head 38 to generate a defect signal which is passed to the defect mapping logic 56 via signal path 59. Recognition of the defect signal by the defect mapping logic 56 results in the current radial and circumferential location of the test head 38 relative to the disc 8 being recorded. Once the test head 38 has passed over the entire usable radial extent of the disc 8, all detected and recorded defects are correlated to produce a defect map of the entire disc surface.

Test units of the type described above and which can be modified to include and implement the present invention are available from several sources. A typical test unit of this type is the model number MSA 450, manufactured by Cambrian Systems, Inc., a subsidiary of Phase Metrics Corporation, located in Westlake Village, Calif.

FIG. 3 is a simplified perspective view of a slider 60 which is the hydrodynamic element of a head assembly. This type of slider 60 could be used with either a test head assembly, such as that noted at numerical reference 38 in FIG. 2 above, or in an operational read/write head, such as that noted at numerical reference 14 in FIG. 1 above. For purposes of the following discussion, the terms "bottom", "lower" and other related terms will be used to designate the side of the slider 60 which cooperatively engages the disc surface, while the terms "top", "upper" and other related terms will be used to designate the side of the slider furthest from the disc surface.

In FIG. 3, the lower side of the slider 60 is shown, and can be seen to include a pair of rails 62 which interact with a thin layer of air dragged along by the spinning disc to form an air bearing which acts hydrodynamically to fly the slider in close proximity to the disc surface. The overall dimensions of the slider 60 and the configuration of the rails 62, along with the relative velocity between the slider 60 and disc and other well known factors, determine the flying height and attitude of the head assembly. In the earliest Winchester disc drives, the slider had a length, measured along the length of the data track, of 0.160 inches, a width of 0.126 inches and a height of 0.034 inches. The slider has shrunk over the years to the so-called "Mini-Winchester" slider (0.112" l×0.088" w×0.024" h), the "50% slider" (0.080" l×0.063" w×0.017" h) and to the "30% slider" (0.049" l×0.039" w×0.012" h), which is currently being integrated into the present generation of disc drives. It is this shrinking of the slider, along with attendant developments in head suspensions and discs, that permits the current 2 $\mu$" flying heights.

Turning now to FIG. 4, shown is a simplified top perspective view of a typical prior art piezo glide test head 70. The glide test head 70 includes a slider 72, such as that described in relation to FIG. 3 above. The glide test head 70 further includes a laterally extending wing 72a, which carries on its upper surface a piezoelectric crystal, or piezo element, 74. The laterally extending wing 72a is necessary because the upper surface of the slider 72 is used to attach the glide test head 70 to a flexure or head suspension.

Wires 76 are connected to the piezo element 74 and, at their opposite ends, to signal detection circuitry (not shown). When the glide test head 70 is cooperatively engaged with a spinning disc, and a surface defect on the disc passes under the glide test head 70, the surface defect causes a change in the hydrodynamic pressure between the glide test head 70 and the disc, or, if large enough, can even cause direct contact between the glide test head and the disc. Such hydrodynamic pressure change or contact causes a minute mechanical distortion or ringing or oscillation of the slider 72. This excitation of the slider 72 causes stresses to be exerted in turn on the piezo element 74. When the piezo element is stressed, it causes an electrical potential to be established between the wires 76 which can be detected by signal detection logic.

It will be apparent to one of skill in the art that the particular configuration of the slider 72 and piezo element 74 will determine the sensitivity of the glide test head 70. That is, the size, shape and materials of the slider 72 and piezo element 74 will determine the size of defect that will be detectable by the glide test head 70.

It is an observed fact, however, that piezo glide test heads of the type described cannot readily detect all media surface anomalies that can lead to thermal asperities. Therefore, different testing methodologies are needed to detect such thermal asperities.

It is well known in the industry that normal MR read/write heads, when flown at or lower than their usual operational flying height, will detect thermal asperities. For instance, when an MR read/write head intended for use at a nominal flying height of 2 $\mu$" is flown for test purposes above a spinning disc at a height of only 1.25 $\mu$", any disc surface defect large enough to affect the operational capability of the disc drive under normal conditions would be expected to contact the MR element, or significantly change the spacing between the MR element and the disc. As previously discussed hereinabove, such contact or spacing variation causes an induced change in the temperature of the MR element, with an attendant change in the electrical resistance of the MR element. Normal data read channels designed for use with MR heads are intended to detect magnetically-induced changes in the resistance of the MR element, and, as such, are capable of detecting these thermally-induced resistance changes under the test conditions described. It is common practice, when using normal MR read/write heads for testing, to utilize heads having the MR element on the outer rail (i.e., the rail closest to the outer diameter of the disc) to ensure testing of the entire data band of the disc.

However, the use of normal MR read/write heads as test heads does have certain limitations and drawbacks that will be discussed below.

FIG. 5 is a simplified perspective view of a typical prior art MR read/write head assembly 80 of the current technology. The MR head assembly 80 includes a slider 82 and a transducer 84. The transducer 84 comprises an inductive write element (not separately designated) and a magneto-resistive read element, or MR element (also not separately designated). The inductive write element and MR read element each require a pair of terminations and connecting wires 86 for operation. In MR heads of the current technology, the MR element is commonly formed of NiFe and has a width, measured across the track width, of 100 $\mu$inches (2.5 $\mu$m). Such heads are capable of recording and retrieving data at a density on the order of≈700–800 megabits per square inch.

The first drawback to the use of such an MR head as a test head for detecting media asperities lies in the width of the MR element. As noted above, this width is only about 100 $\mu$inches. Therefore, the actuator used to move the MR head across the disc during testing must move the head in increments no greater than this width in order to sweep the entire disc surface. This means that in order to effectively test the entire data recording area of a typical 3½" disc, the test unit actuator (36 in FIG. 2) must perform approximately 10,000 individual seeks of the head across the disc, and maintain the test head at each location for a time interval sufficient to allow the disc to make an entire revolution under the test head. Thus, using an MR read/write head in a test unit of the current technology such as the Cambrian MSA 450 noted above, it would require a minimum time of approximately 10 to 20 minutes to test one side of one disc. Such a prolonged testing time makes the use of such normal MR readwrite heads as test heads both economically and practically infeasible.

Turning now to FIG. 6, shown is a simplified top perspective view of a combination TR/piezo glide test head assembly 90 which forms a principal aspect of the present invention. The figure shows that the combination glide test head assembly 90 of the present invention is similar in top view to the simple prior art piezo glide test head 70 of FIG. 4. This is because the present invention envisions that the combination TR/piezo test head assembly 90 includes a piezo element 92 similar to that of the piezo test head 70 of FIG. 4. That is, the piezo element 92 reacts to stresses induced in it when the slider is distorted by flying over a defect in the disc surface by generating an electrical signal on wires 94. The figure also shows a thermo-resistive, or TR, element 96 which is deposited on the trailing surface of the slider, and has its own set of terminations which also are connected by a second set of wires 97 to electronic circuitry as will be discussed below. It is the combination of this standard piezo element 92 with the TR element 96 that constitutes a principal element of the present invention.

FIG. 7 shows a simplified bottom perspective view of the combination TR/piezo test head assembly 90. In this bottom view, a wide TR element 96 can be seen. This wide TR element has a width substantially greater than that of the MR element shown in FIG. 5. The factors involved in determination of the width of the TR element 96 will be discussed in more detail below. The material of the TR element 96 of the inventive glide test head does not have to be selected for sensitivity to magnetic changes as is the case with an MR element in an operational MR read/write head and can, instead, be specifically optimized to maximize sensitivity to changes in temperature induced by contact and non-contact TAs on the disc surface.

Several different materials for the TR element 96 have been considered, and the table below summarizes a comparison of the thermal sensitivity and corrosion resistance of the four materials currently believed to be most suitable.

| Material | Thermal Sensitivity Ohms/ohm/degree C | Corrosion resistance rank (1 = best) |
|---|---|---|
| Nickel | 0.00639 | 3 |
| Tungsten | 0.00439 | 2 |
| Tantalum | 0.00348 | 1 |
| 80/20 NiFe(Permalloy) | 0.00500 | 4 |

From the table, it is apparent that if material selection for the TR element of the test head is to be determined solely on the basis of thermal sensitivity, then the material of choice would be nickel. The table does point out, however, that, of the four materials currently believed to be best suited, nickel is ranked next to worst for resistance to corrosion or wear. Process equipment for depositing 80/20 NiFe (Permalloy) is already in use, and this material also has a relatively high sensitivity to thermal changes. Permalloy can be seen in the table, however, to have the worst corrosion and wear resistance of the four materials.

Of the four materials, tantalum provides the best corrosion resistance, but offers the lowest thermal sensitivity of the four. Therefore, if a compromise between thermal sensitivity and corrosion resistance were to be selected, tungsten would be the material of choice. It should be recalled, however, that the relative importance of thermal sensitivity and corrosion resistance are dependent on the entire test system environment, including the discs being tested. In test environments of the current technology, the optimum material for the TR element of the combination TR/piezo glide test head assembly is believed to be nickel, due to its high rate of resistance change as a result of temperature change. The scope of the invention, however, is envisioned to be large enough to cover a wide range of materials and alloys, the selection of any of which would be best determined by one of skill in the art based on an engineering analysis of the specific testing environment.

In test heads of the current generation, the rails 98 of the slider have a width of approximately 250 micro-meters. Allowing for manufacturing tolerance at either side of the rail and the width of the attachment leads for the wires connecting the TR element to sensing logic, a TR element approximately 100–150 $\mu$m wide can be fabricated on the trailing edge of the rail of a test head. A TR element 96 of this width will allow the entire data band of a 3½ " disc to be tested in approximately 180 to 250 steps of the test unit actuator, thus allowing much more rapid testing of a disc than was noted above for testing with a typical MR read/write head, which, as previously noted, has a MR element only on the order of 2.5 $\mu$m wide.

The details of the configuration of the TR element 96 can best be appreciated by an examination of FIG. 8 which is a simplified elevation view of the presently preferred embodiment of the wide TR element 96 of the combination TR/piezo glide test head. The effective width $W_e$ of the sensor TR element 96 is, as previously stated, preferably as wide as is possible to fabricate on the trailing edge of one air bearing element of a test head allowing for manufacturing tolerance and the width of the connecting leads, and is, therefore, in the case of currently used test head assemblies, on the order of 100–150 micro-meters. FIG. 8 shows that the width of the slider air bearing element, $W_{abs}$, minus the manufacturing tolerance, $T_m$, at either side of the air bearing element and minus the width of the connecting leads L1 and L2 equals the effective width, $W_e$, of the wide TR element.

As illustrated in FIG. 8, during operation of a glide test head incorporating the TR element 96, a constant reference current i would be passed through the TR element 96 in the direction shown by the arrows, i.e., from a first connecting lead L1 to a second connecting lead L2. The TR element is exposed at the air bearing surface 100 of the slider air bearing element in which it is mounted. When a TA in the disc surface being tested passes under the TR element 96, a small region of the TR element 96 local to the asperity undergoes a temperature change as previously described, producing a transient resistance change δR in the TR element 96. An ac coupled differential amplifier connected across leads L1 and L2 would be capable of detecting the presence of an asperity by the voltage transient δV=i·δR, regardless of where along the length of the TR element 96 the asperity passes.

FIG. 8 also shows the presence of intermediary taps 102a, 102b which can optionally be incorporated within the structure of the TR element 96. The incorporation of such intermediary taps 102a, 102b, together with associated detection electronics, would allow for more precise identification of the position of the media asperity should such more precise mapping be desirable. The number and relative spacing of intermediary taps would be dependent upon the desired precision of asperity mapping.

In FIG. 8, for instance, it will be noted that the spacing between principal lead L1 and intermediary tap 102a is smaller than the spacing between intermediary taps 102a and 102b, and that the spacing between intermediary tap 102b and principal lead L2 is larger than either of these spacings or the spacing between principal lead L1 and intermediary tap 102b. Such relative spacing of the principal leads L1 and L2 and intermediary taps 102a, 102b allows for great flexibility in the precision of mapping of thermal asperities by simply selecting the pairs of leads across which the detection logic is connected. That is, the coarsest mapping precision will be achieved by connecting the detection logic across the L1–L2 lead pair, thus sensing any TA passing beneath the entire effective width, $W_e$, of the TR element. The finest mapping precision can be achieved by connecting the detection logic across the L1-102a lead pair. Utilization of the other possible lead combinations, 102a–102b, L1-102b, 102b-L2, would provide mapping precisions of decreasing intermediary precision, due to the increasing width of TR element lying between these lead pairs.

FIG. 16 is a simplified block diagram of electronic circuitry which can be used to perform the tap selection described immediately above. In FIG. 16, the L1 and L2 primary leads of the TR element (96 in FIGS. 6, 7, 8, 9 and 10) and intermediary taps 102a, 102b are inputs to a multiplexer 240. Selection inputs, sel, are programmable under control of other logic (not shown) and serve to determine which pair of TR element taps will be passed by the multiplexer 240 to the multiplexer outputs 242, 244. The multiplexer outputs 242, 244 are applied to a differentiating element 112 which forms a portion of the TA detection circuitry for the TR element. Table 1 below provides an example of how the select inputs, further designated in FIG. 16 as 0, 1 and 2, can be used to select which of the TR element taps are utilized for TA detection, and thus the precision of the scanning of the disc surface.

From an examination of Table 1 and FIG. 16, it is apparent that through controlled selection of the selection inputs, S0, S1, S2, unique combinations of the taps of the TR element 96 are gated through the multiplexer 240 to the differentiating element 112 of the TA detection logic. Furthermore, if the specific tap layout of FIG. 8 is taken into consideration, it can be seen that Table 1 shows the selection of taps of the TR element that will provide the coarsest (L1–L2) precision for scanning of the disc surface to the finest (L1-102a) precision for scanning of the disc surface as the table is read from top to bottom. While FIGS. 8 and 16 and Table 1 refer to a TR element that include two intermediary taps 102a, 102b arranged to provide six different effective widths for use in scanning the disc for TAs, the specific configuration of tap number and tap spacing should not be considered as limiting to the scope of the invention.

TABLE 1

| S2 | S1 | S0 | 242 | 244 |
|---|---|---|---|---|
| 0 | 0 | 0 | L1 | L2 |
| 0 | 0 | 1 | 102a | L2 |
| 0 | 1 | 0 | 102b | L2 |
| 0 | 1 | 1 | L1 | 102b |
| 1 | 0 | 0 | 102a | 102b |
| 1 | 0 | 1 | L1 | 102a |

In actual use, specific utilization of the selectable taps of the TR element 96 can be used to quickly scan the disc surface for TAs using the widest possible TR element width, and then more precise scanning can be performed in the areas where TAs are encountered to more precisely locate the TAs and allow the smallest possible area of the disc surface to be added to a media defect list, thus minimizing that portion of the disc surface restricted from use.

FIG. 9 shows a plan view of the TR element 96 looking at the air bearing surface of a portion of a rail 98 of a slider. The relative sizes of elements shown in FIG. 9 are not to scale and are selected for illustrative purposes only. It is also envisioned that the structure of the TR sensor would include high thermal conductance shield layers 104, 106 in front of and in back of the TR element 96 for optimum heat dissipation. These shield layers are separated from the TR element 96 by thin layers of sputtered alumina 108.

The leading shield layer 104, i.e., that layer which would pass over a thermal asperity before the TR element 96, is envisioned to be formed of a hard, brittle material such as sendust or a cobalt-tantalum alloy for added protection of the TR element 96 from scratching. It should be noted again, however, that neither the TR element nor the shield layers need be magnetic in nature, and can, therefore, be selected solely on the basis of their thermo-resistive and tribological characteristics.

While the present invention envisions a combination TR/piezo test head assembly, as illustrated in FIGS. 6, 7, 8 and 9, it will be apparent to one of skill in the art that the TR element 96 described in relation to FIGS. 7, 8 and 9 above could be used by itself on a slider in a glide test head assembly without the piezo element 92 of FIG. 6. Such a thermo-resistive glide test head assembly would, in and of itself, be useful in the industry, inasmuch as it would provide an improved glide test head assembly capable of detecting thermal asperities in the surface of a disc in a more efficient and cost effective manner than is currently achievable by the use of standard MR read/write heads for such testing.

Furthermore, as will also be apparent to one of skill in the art, other forms of slider could readily be used with either the combination piezo/TR test elements described above, or with just a TR element as noted above. For instance, a slider incorporating negative-pressure air bearings (NPAB) or a slider of the type referred to as a "tri-pad" slider can be adapted to incorporate either the combination of piezo and TR elements or just the TR test element. Therefore, when statements are made herein concerning the location of the TR element relative to the slider, it is assumed that all types of slider air bearing surface configurations are included, and that all locations at which the TR element is readily locatable are also included.

FIG. 10 shows a simplified block diagram of electronic control circuitry which can be used in conjunction with a standard test unit, such as that of FIG. 2, and the combination TR/piezo glide test head assembly of FIGS. 6 through 9 to accomplish simultaneous mapping of defects in disc surfaces.

In the figure, the combination TR/piezo glide test head assembly 90 is shown to include both a piezo element 92 and a TR element 96, the outputs of which are directed to differentiating elements 110 and 112, respectively. The outputs of the differentiating elements 110, 112 are, in turn, provided to amplifying and filtering elements 114 and 116, which supply media defect signals via signal paths 118 and 120, respectively, to defect mapping logic 122. This defect mapping logic 122 is similar to the defect mapping logic 56 previously described in relation to the prior art standard test unit of FIG. 2. That is, the defect mapping logic 122 also receives an input on signal path 54 which is reflective of the angular position of the disc under test, as provided by the spin motor in the spin stand of the test unit, and further receives another input on signal path 58 which represents the position of the linear actuator of the test unit, and thus the radial position of the glide test head 90 relative to the disc under test. The difference between the defect mapping logic 122 of FIG. 10 and the prior art defect mapping logic of FIG. 2 is that the defect mapping logic 122 of FIG. 10 is capable of simultaneously detecting and correlating media defects detected by either the piezo element 92 or the TR element 96, and is thus capable of mapping both piezo-detected and thermo-resistive-detected defects. The savings in time provided by this improved test system, coupled with the additional cost and labor savings provided by the wide TR element described above, result in a much improved system for detecting and mapping defects in the surfaces of disc media.

It should also be recalled that the TR element can include intermediary taps selectively passed to the differentiating element 112, as previously noted hereinabove, to determine the precision of disc scanning for thermal asperities.

Yet another advantage provided by the present invention relates to a characteristic of MR head disc drives called Base-Line Modulation, or BLM. BLM can best be understood from an examination of FIGS. 15A and 15B, which show the component relationships leading to BLM and the sensed result of BLM in the read data channel, respectively.

In the preceding discussions of TA generation as related to FIGS. 11A, 11B, 13A, 13B, 14A and 14B, the assumption was made that the surface of the discs was perfectly flat except at the location of the thermal asperities. As is known to those of skill in the art, however, such is not the case. As can be seen in FIG. 15A, in discs manufactured using current technology, the actual surface 220 of the discs exhibits a certain "waviness", with the peaks of these disc surface waves being separated on the average by approximately 100–500 µm depending on the manufacturing process and the substrate material, as shown by double-headed arrow 222, and a peak-to-valley dimension which is also dependent on the process used to fabricate the disc under test and the substrate material. As can be seen in FIG. 15A, waviness of this order is relatively insignificant when compared to the dimensions of the slider, and, as such, has little or no effect on the average flying height of the slider 224. Since a typical MR element 226 has a dimension along the direction of disc rotation of approximately 0.05 µm, the peak-to-peak dimension 222 of the average disc surface roughness is very large when compared to MR stripe thickness.

Disc surface variations of this order have a noticeable effect when considering the thermal characteristics of MR read/write heads. As previously noted above in the discussions of FIGS. 13A, 13B, 14A and 14B, non-contact thermal asperities can cause undesirable heating and cooling of the MR element in a MR head due to changes in the proximity of the MR element to the disc surface. That is, low spots on the disc surface cause a reduction in heat dissipation from the MR element to the disc, leading to increased temperature and resistance in the MR element, while high spots on the disc surface have the opposite effects: increase in heat dissipation, leading to reduced temperature and resistance in the MR element. If this thermally induced increase or decrease in the resistance of the MR element is great enough, the resultant voltage spike in the read data channel can cause the read data channel logic to be incapable of reliably recovering magnetically recorded data.

Turning now to FIG. 15B and comparing it to FIG. 15A, the waviness of the disc surface when compared to the relative constancy of the flying height of the slider will indeed lead to thermally induced changes in the resistance of the MR element 226. As a "peak" in the disc surface passes under the MR element 226, more heat will be dissipated from the MR stripe 226 to the disc, and as a "valley" in the disc surface passes under the MR stripe 226, less heat will be dissipated from the MR stripe 226 to the disc. These variations in the thermal dissipation from the MR stripe 226 result in corresponding changes in the resistance of the MR stripe 226.

As the peaks and valleys of the disc surface pass under the MR element 226, therefore, the sensed voltage across the MR element 226 will vary accordingly, due to the constant bias current being applied across the MR stripe 226, and, while these variations in the sensed voltage across the MR stripe 226 may not be large enough to saturate or fail to trigger the read data channel logic, they do result in modulation of the base line of the sensed voltage level. This modulation of the base line of the sensed voltage level due to disc surface waviness is the phenomenon referred to as "Base-Line Modulation", or BLM.

In FIG. 15B, it can be seen that the read data reference voltage 230, about which the magnetically induced read data 232 is varying, is being modulated in inverse relationship with the proximity of the surface contours of the disc to the MR element 226. That is, when the disc surface 220 nears the MR stripe 226, additional heat is dissipated from the MR stripe 226 to the disc, the MR stripe 226 cools, the MR stripe resistance goes down and the read data reference voltage 230 goes down. Conversely, when the disc surface recedes from the MR element 226, less heat is dissipated from the MR element 226, the MR stripe 22 heats up, the MR stripe resistance goes up and the read data reference voltage 230 goes up. One of skill in the art will realize that FIG. 15B shows an idealized waveform for purposes of illustration and discussion only. An actual BLM waveform would vary in both amplitude and wavelength, in accordance with the irregularity of the disc surface.

While the amplitude of the BLM, $V_{BLM}$, is relatively small compared to the amplitude of changes in the read voltage due to magnetically recovered data, $V_{mr}$, the logic of the read data channel must be designed to take into consideration this BLM. That is, the read data channel must filter out the relatively low frequency BLM. However, such filtering results in a corresponding loss of sensitivity to the sensed voltage changes in the read data channel due to previously recorded magnetic data.

The problem of Base-Line Modulation is exacerbated by the fact that the materials currently in use for MR elements require relatively high bias currents and the fact that the amplitude of BLM is a function of the cube of the bias current ($i^3$). Therefore, even a small increase in bias current is reflected in a relatively large increase in BLM. In practice, it has been found that NiFe MR elements typically in use in the industry require a bias current of approximately 12 mA.

In the purely thermo-resistive test element described herein, however, the magneto-resistive characteristics of the test element are much less significant. Indeed, it has been found that optimizing the sense logic and the material of the test element for thermo-resistive sensitivity allows the use of a bias current on the order of approximately 2 mA, greatly reducing the BLM of the test system and allowing a corresponding increase in the sensitivity of the test system to TA detection.

While the glide test head and testing system just described make use of material selection and reduced bias current to increase the sensitivity of the system for TA detection, in another aspect of the invention selection of test element material and an increase in applied bias current through the TR element provide yet another useful capability for characterizing the surface of a disc.

Specifically, if a test element is included in a glide test head that maximizes the effects of BLM noted above, a test system for mapping the topography of the disc surface can be achieved. In such a system, the optimum material for the TR element would not be nickel, as noted above. Rather a material with a high thermal coefficient of resistance and high electrical resistance is best suited for this aspect of the invention, with 70/30 NiFe being the currently preferred material. Again, other materials, including non-magnetic materials, may be preferred, depending upon other overall system requirements, as also noted previously above, and the scope of the present invention is not considered as being limited by the particular material selection.

In order to optimize the temperature variation experienced by the TR element as a result of BLM, and thus increase the sensitivity of the test system, it is envisioned that test heads intended for topographic mapping of disc surfaces will omit the heat dissipating shields (104, 106 in FIG. 9). Manufacturing a test head without the shield elements will result in more of the heat generated in the TR element having to dissipate across the air bearing into the discs, and thus increase the effects associated with BLM. That is, the TR stripe in the test head will run at a higher thermal equilibrium temperature, and the amplitude of BLM will be correspondingly increased. However, test heads including shielding elements can be used if the decrease in overall sensitivity is permissible.

Furthermore, since, as noted above, the amplitude of the BLM signal is proportional to the cube of the bias current applied across the TR element, this aspect of the invention envisions that the bias current will be increased to further increase the sensitivity of the test system.

In a test system specifically implemented for topographic mapping of disc surfaces, the BLM along entire circumferential length of disc surface passing under the test head is sensed, converted to digital values and stored, providing circumferential topographic data. When the test system steps the head to the next radial position on the disc surface, comparison of the stored BLM values for adjacent radial test locations, when correlated to a common circumferential starting point, provides radial topographic data. This circumferential and radial BLM data can be graphically displayed or printed to provide a picture of the disc surface, or can be arrayed in a data base which can be used to enable compensation for specific disc surface characteristics in the completed disc drive, as will be discussed below.

As will be appreciated by one of skill in the art, the radial resolution of the topographic mapping of the disc surface will be determined by the width of the TR test element included in the test head, with narrower test elements providing increased resolution. It should be recalled, however, that decreasing the width of the test element increases the number of radial steps that must be taken to position the test element over all portions of the disc surface. Again, utilization of a tapped test element, such as that described above in association with FIG. 8, allows dynamic selection of mapping resolution, and, if certain compromises are acceptable, the same test head used for TA mapping can be used for topographic mapping as well. If the same head can be used for both types of testing, it is easy to envision a test system that will both map TAs and provide topographic data without the necessity of changing the test setup or additional disc handling.

FIG. 17 shows a simplified functional block diagram of a test system for topographic mapping of disc surfaces. While the block diagram of FIG. 17 and accompanying discussion envision that the test system will be implemented in a computer system, such as a high performance personal computer, the person of skill in the art will realize that the logic associated with the test system could also be implemented in a commercially available test system, such as those previously mentioned above.

In FIG. 17, the BLM-optimized TR test head 250 provides raw BLM analog data to a preamplifier 252, which passes the amplified signal to a high speed Data Acquisition board (DAQ) 254 that is included in a personal computer. Operation of the DAQ 254 is under control of Control and Mapping Software 256 which is executing in the PC. The data collected by the DAQ 254 is provided to a Digital Signal Processor (DSP) 258, which also receives information reflecting the radial position, Pr, and circumferential position, Pot of the test head 250 relative to the disc being analyzed. The DSP 258 is also operating under control of the Control and Mapping Software 258.

The accumulated BLM data, correlated with the radial and circumferential position on the disc, is stored in the PC Memory 260. Once collection of BLM data for the entire disc surface is completed, the Control and Mapping Software outputs a topographic map 262 of the disc surface. One of skill in the art will be aware that the topographic map 262 can be in the form of drive signals for display on a CRT, printer data for producing a hard copy picture of the disc surface or in the form of a data base which can be utilized by other analysis equipment.

The capability of developing a topographic map of the surface of a recording disc can be of great value in several different areas of the industry. For instance, a media manufacturer can make use of the topographic map to monitor his manufacturing process and control the quality of his product. A disc drive manufacturer can use the topographic mapping capability of the present invention as a tool for incoming inspection of media supplied by outside vendors to ensure that incoming disc components conform with design specifications, and that discs from differing sources or in different manufacturing batches are consistent. Furthermore, a data base containing topographic data for individual discs can be loaded into a finished disc drive which incorporates the discs. Then, given adequate microprocessor bandwidth and memory within the disc drive, the topographic information can be used to tune the read channel logic to compensate for BLM, thus enabling greater sensitivity in the data channel, leading to the potential for increasing areal recording density.

One of skill in the art will also appreciate that the topographic mapping capability provided by the present invention represents a significant advance in the art, since the only prior art systems providing such capability included such expensive capital equipment as optical, stylus or atomic force surface mappers or scanning electron microscopes (SEMs), and the investment of long testing times and expensive data conversion systems to convert the output of the SEM or similar equipment to data in a usable form.

The topographic mapping capability of the present invention, by contrast, requires only the inclusion of the new test head described herein in a commercially available test system, along with relatively inexpensive data acquisition hardware and either commercially available or custom created mapping software. It is feasible, therefore, for the topographic mapping capability of the present invention to be replicated in multiple test systems with a much smaller investment in capital equipment. Furthermore, since the topographic mapping system described can acquire the topographic information in a relatively short time interval, in-process analysis of all discs incorporated in the disc drive manufacturing process can be accomplished rather easily, increasing the reliability and consistency of the final disc drive product.

For purposes of the appended claims, the term "thermo-resistive element" is intended to be construed to mean thermo-resistive elements such as those elements designated with numerical reference number 96 in the accompanying drawings and text, and to specifically exclude magneto-resistive elements as implemented in normal MR read/write heads.

From the foregoing, it is apparent that the present invention is particularly well suited and well adapted to achieve the objects set forth hereinabove, as well as possessing other advantages inherent therein. While a particular combination of components and materials have been disclosed with regard to the presently preferred embodiment, certain variations and modifications may suggest themselves to one of skill in the art upon the reading of this disclosure. Therefore, the scope of the present invention should be considered to be limited only by the following claims.

What is claimed is:

1. A thermo-resistive glide test head assembly for detecting thermal asperities in the surface of a rotating magnetic recording disc comprising:

a slider, having a plurality of air bearing elements, the air bearing elements each having a form and dimensions, including a width at the trailing edge of said slider, selected to hydrodynamically support the glide test head assembly in a predetermined relationship to the surface of the disc; and a thermo-resistive element, disposed substantially at the trailing edge of one of said air bearing elements of said slider and having a maximum width maximized in relationship to the width of the air bearing element on which it is disposed, for providing a thermal asperity detection signal when a thermal asperity in the surface of the rotating disc passes beneath the thermo-resistive element and induces a resistance change in the thermo-resistive element, the thermo-resistive element also comprising primary lead connections disposed at opposing ends of the thermo-resistive element for connecting the thermo-resistive element to sensing circuitry; and one or more intermediary taps disposed along the width of the thermo-resistive element between the primary lead connections, the intermediary taps serving to divide the maximum width of the thermo-resistive element into selectable, differing effective width portions, the intermediary taps connected to intermediary lead connections for connection to sensing circuitry, whereby selection of pairs of the primary and intermediary lead connections and connection of a selected pair of lead connections to sensing circuitry allows differing precision in the determination of the location of the defects in the surface of a magnetic recording disc.

* * * * *